United States Patent [19]

Kurokawa et al.

[11] 4,240,849
[45] Dec. 23, 1980

[54] POLYMER OPTICAL CIRCUIT WITH OPTICAL LEAD-FIBERS AND METHOD OF FABRICATING THE SAME

[75] Inventors: Takashi Kurokawa; Norio Takato; Shigeru Oikawa; Yuzo Katayama, all of Mito, Japan

[73] Assignee: Nippon Telegraph and Telephone Public Corporation, Tokyo, Japan

[21] Appl. No.: 916,062

[22] Filed: Jun. 16, 1978

[30] Foreign Application Priority Data

Jun. 21, 1977 [JP] Japan ................................. 52/72755

[51] Int. Cl.$^3$ ............................................. G02B 5/172
[52] U.S. Cl. .................................. 156/73.2; 156/73.3; 156/242; 156/272
[58] Field of Search ...................... 156/73.2, 73.3, 242, 156/272

[56] References Cited

U.S. PATENT DOCUMENTS

| 4,089,583 | 5/1978 | Auracher et al. | 350/96.15 |
| 4,090,902 | 5/1978 | Ferrentino et al. | 156/272 X |

FOREIGN PATENT DOCUMENTS

| 2151781 | 4/1973 | Fed. Rep. of Germany | 350/96.12 |
| 2609143 | 8/1977 | Fed. Rep. of Germany | . |

OTHER PUBLICATIONS

Auracher, "Planar Branching Network for Multimode Glass Fibers" Optics Communications, vol. 17, No. 1, Apr. 1976, pp. 129-132.
Auracher, "Verzweigungseinrichtungen für Lichtwellenleiter" Seimens Forsch -U. Engtwickl.-Ber., vol. 5, No. 1., 1976, pp. 47-93.

Primary Examiner—James R. Hoffman
Attorney, Agent, or Firm—Frishauf, Holtz, Goodman & Woodward

[57] ABSTRACT

A polymer optical circuit with optical lead-fibers which comprise a plurality of optical fibers, each one end portion thereof being embedded in a transparent polymer film formed on a substrate, and polymer optical waveguides formed in the film between the embedded ends of the optical fibers so that the terminal ends of the optical waveguides are connected with the embedded ends of the optical fibers; the substrate, polymer film, polymer optical waveguide and optical fibers being formed as an integrated unit. A process for fabricating this polymer optical circuit is also disclosed.

8 Claims, 7 Drawing Figures

POLYMER OPTICAL CIRCUIT WITH OPTICAL LEAD-FIBERS AND METHOD OF FABRICATING THE SAME

BACKGROUND OF THE INVENTION

This invention relates to a polymer optical circuit including optical waveguides to which optical fibers are connected as input- and output-terminals.

In the prior art of optical waveguides of this sort, optical accuracy should be carefully taken into consideration when optical fibers are connected to the optical waveguide. Hence, the connecting process becomes complicated and necessitates an improvement in the connections such as the use of a connector or a finely adjustable jig-and-fixture. Accordingly, unavoidable difficulties are apt to occur in the miniaturization and economization of the optical circuit.

The invention of Siemens Company (refer to DT-OS No. 2,609,143 and "Optics Communication" vol. 17, No. 1. pp. 129 to 132) may be cited as an improvement on the above-mentioned process of connecting optical fibers to an optical waveguide. According to the method of Siemens Company, an optical strip waveguide with a branching structure as well as grooves for aligning optical fibers are formed through a photoresist laminated on a substrate by means of a photolithograph process. Namely, a photosensitive polymer film substantially as thick as the diameter of optical fibers is laminated on the substrate, and exposed to a light through a designed photomask. After development of the photosensitive polymer film, the optical fiber-locating grooves and optical strip waveguide are formed at the same time, thereby attaining the exact alignment of the optical fibers and optical waveguide.

The optical fibers are inserted into the locating grooves to bring the end faces of the optical fibers into contact with the end faces of the branched optical waveguide. In this case, however, air tends to be retained at the butt joints between fibers and strip guides. As a result, the reflection loss at the contact plane becomes increased. To reduce the reflection loss, it is necessary to use matching oil in order to ensure full contact between the above-mentioned end faces of both members. Moreover, the waveguide loss becomes very large, that is, 10 to 20 dB/cm at $\lambda=0.63$ $\mu m$, and 2 dB/cm at $\lambda=1.15$ $\mu m$. Thus, it is difficult to fabricate an optical circuit with low losses. Further, optical fibers fixed in the locating grooves tend to be loosened with time.

An object of this invention is to obtain an optical circuit having lead-fibers in which optical fibers employed as input- and output-terminals are integrally connected to the optical waveguides so that they form an integrated unit, in order to solve the defects mentioned above.

SUMMARY OF THE INVENTION

This object can be attained by preparing a polymer optical circuit with optical lead-fibers which comprise a plurality of optical fibers, each one end portion thereof being embedded in a transparent polymer film mounted on a substrate, and a polymer optical waveguide having a higher refractive index than that of the polymer film, which is formed in the film between the embedded ends of said optical fibers so that the terminal ends of said waveguide are aligned with the embedded ends of said optical fibers in perfect connection; the optical circuit being formed with the substrate, polymer film, polymer optical waveguide and optical fibers as an integrated unit.

DETAILED DESCRIPTION

Figure 1:
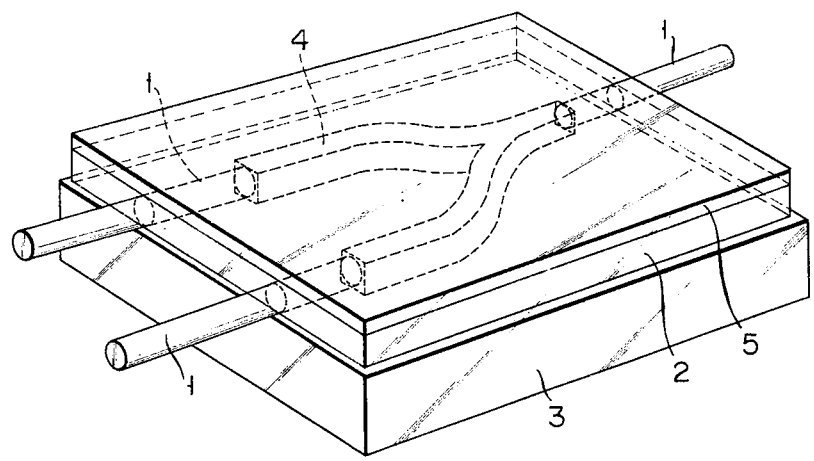
FIG. 1 is an enlarged explanatory perspective view showing an embodiment of a polymer optical circuit of this invention, wherein the framework 7 (FIG. 2) is detached from the optical circuit for the sake of convenience.

Referring to FIG. 1, there is shown a perspective view of an embodiment of polymer polymer optical circuit of this invention, which comprises optical fibers 1, a polymer film 2, a substrate 3, a polymer optical waveguide 4 formed in the polymer film 2, and a polymer cladding layer 5 for the protection of the upper surface of the circuit. The substrate 3 also serves as a cladding layer for the rear surface of the circuit.

There will now be described the fabrication process of the polymer optical circuit of this invention by reference to the following description and accompanying drawings.

There is provided a substrate 3, the size thereof being, for example, 30 mm long, 10 mm wide and 1 mm thick. This substrate 3 used as protective cladding for a branched polymer optical waveguide 4 later mounted thereon and which has to be prepared from a transparent material, such as glass ($n_D=1.5$) or methylpentene polymer ($n_D=1.46$), which has a smaller refractive index than the optical waveguide, and is saved during the following casting step from dissolution, cloudiness and cracks all caused by a polymer film solvent. Shallow V-shaped grooves 6 for receiving the end portion of optical fibers are formed in those positions on the surface of the substrate 3, which constitute the input- and output-terminals of the optical circuit. The above-mentioned grooves 6 can be formed on the glass substrate 3 by the so-called ultrasonic cutting method, or the substrate 3 having grooves 6 and a framework 7 can be made as an integrated unit from methylpentene polymer by plastic molding.

Figure 2:
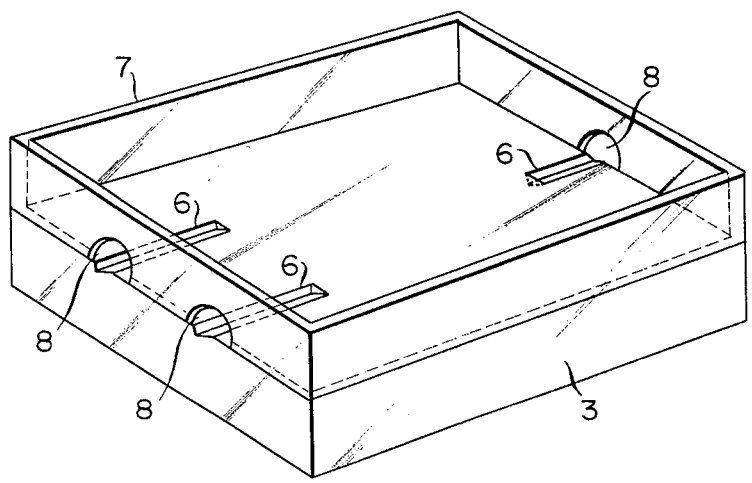
FIG. 2 is an enlarged explanatory perspective view showing an union of substrate and framework which is used in the fabricating steps of the polymer optical circuit shown in FIG. 1.

A framework 7 shown in FIG. 2 is connected to the upper peripheral portion of the substrate 3 in order to cast a polymer solution on the substrate 3. The framework 7 has holes 8 through which the optical fibers will be inserted.

Figure 3A:
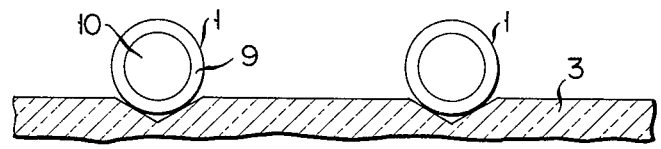
FIGS. 3A–3E show the fabrication order of the method of this invention.

The optical fiber 1 is placed on the groove 6 through the hole 8 with the end of the fiber 1 made to contact the end of the groove 6 as shown in FIG. 3A. At this time, the optical fiber 1 is bonded to the groove 6 by an epoxy resin adhesive. Then the hole 8 is sealed with the same adhesive. As shown in FIG. 3A, the optical fiber 1 is made of a glass core 10 covered by a glass cladding layer 9. The groove 6 has such a V-shaped cross section as to cause the bottom line of the circular cross section of the glass core 10 to be substantially aligned with the surface of the substrate 3. This arrangement reduces mismatching during the mutual coupling of the end face of the optical waveguide 4 and that of the glass core 10 of the optical fiber 1.

Figure 3B:
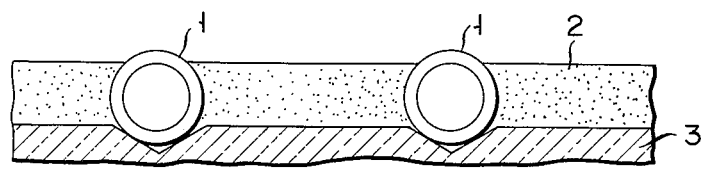

When an optical fiber 1 has a 100 μm core diameter as well as a 150 μm outer diameter and a 1% refractive index difference between the core and cladding, the substrate 3 with the framework 7 securely holding the optical fibers 1 are horizontally placed in a dry box in which nitrogen gas is blowing. A polymer solution is cast to form a polymer film 2 about 90 microns thick on the substrate 3. The polymer solution consists of, for example, 100 g of methylene chloride as a solvent, 2 g of polycarbonate ($n_D=1.59$) synthesized from 1,1-(4,4'-dihydroxydiphenyl)cyclohexane as a matrix polymer, 1 ml of methyl acrylate as a dopant monomer polymerizable by irradiation of a u.v. light ($n_D$ in the polymer state=1.47), 2 mg of benzoine ethylether as a photosensitizer, and 0.1 mg of hydroquinone as a thermal inhibitor. A proper amount of the above-mentioned polymer solution is cast on the substrate 3 and dried for 5 hours at 30° C. for evaporation of methylene chloride, thereby forming a polymer film 2 about 100 microns thick on the substrate 3 as shown in FIG. 3B. Fine spots indicated in the polymer film 2 show the presence of monomer particles.

Figure 3C:
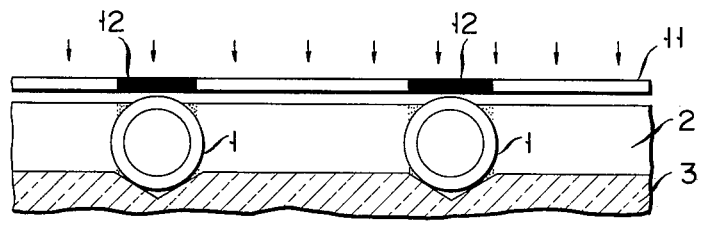

Referring to FIG. 3C, the polymer film 2 is covered with a glass photomask 11 which has a waveguide pattern 12 with 90 microns width. In this case, it is advised to observe microscopically a matching between the end face of the optical fiber 1 embedded in the polymer film 2 and that of the optical waveguide pattern 12 in order to ensure complete alignment between both end faces. Ultraviolet light is irradiated for about 10 minutes on the mask 11 from a 500 W ultra high pressure mercury lamp in the direction of arrows shown in FIG. 3C. As a result, the methyl acrylate monomer contained in the polymer film 2 is selectively photopolymerized at the exposed part and the refractive index of the exposed part becomes lower than the remaining portions.

Figure 3D:
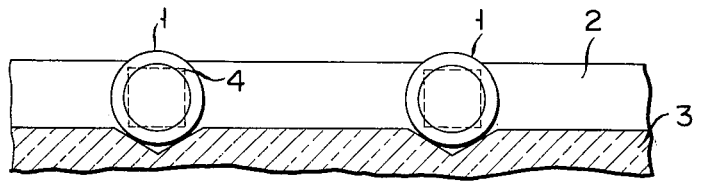

After removal of the glass photomask 11, the light-exposed film 2 is dried for about 8 hours at 85° C in a vacuum to evaporate the unreacted methyl acrylate monomer remaining in the polymer film 2. The unexposed portions of the polymer film 2 which are now only formed of the aforesaid polycarbonate constitute the optical waveguide 4 having a higher refractive index than the exposed portions of the polymer film 2. FIG. 3D indicates parts of the optical waveguide 4. The difference between the refractive indices of the polymer film 2 and optical waveguide 4 can be controlled within the range of 0.5 to 2.5% in accordance with a casting time, namely, a period extending from the moment when the polymer solution begins to be poured into the framework 7 to the moment when the light irradiation is started, so as to range between 4 and 15 hours.

Figure 3E:
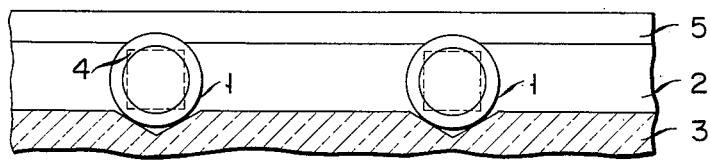

The above-mentioned steps provide a polymer optical circuit embodying this invention. However, it is preferred, as shown in FIG. 1 and FIG. 3E, to coat the polymer film 2 with a layer, for example, of polyglycol type epoxy resin ($n_D=1.52$) containing a hardener, and cure the resin for about 2 hours at 60° C., thereby forming a transparent cladding layer 5 having a low refractive index.

A sample of a polymer optical circuit prepared by the method of this invention was tested to determine the transmission loss of He-Ne laser light. With the optical waveguide having the shape shown in FIG. 1, the waveguide loss was 0.15 dB/cm. At the connecting point between the optical waveguide 4 and optical fiber 1, the connection loss was about 0.5 dB. A laser light loss throughout the entire polymer optical circuit was about 1.5 dB.

According to this invention, there is obtained polymer optical circuit having an optical waveguide with low transmission loss, with which optical fibers are integrally attached as lead-fibers. Therefore, an optical transmission system and the present polymer optical circuit can be connected together very easily and stably by splicing optical fibers or by means of connectors. Since the end portions of the optical fibers 1 are bonded to the substrate 3 to be embedded in the polymer film 2, the optical fibers 1 are firmly connected to the optical waveguide 4 to prevent air from being carried into the junction of both members, thereby greatly reducing the reflection loss of a laser light at the boundary thereof, and making it unnecessary to apply the previously described matching oil.

What we claim is:

1. A method of making a polymer optical circuit which includes an optical waveguide to which optical fibers are connected as input- and output-terminals, the method comprising:

fixing with an adhesive each end portion of a plurality of optical fibers to V-shaped grooves provided on a transparent substrate at previously designed positions, the substrate having an upper peripheral portion;

casting a polymer solution, which comprises a matrix polymer, an organic solvent, a photopolymerizing monomer, a UV sensitive sensitizer and a thermal inhibitor, into a framework fixed to the upper peripheral portion of the substrate having the optical fibers;

evaporating the organic solvent contained in the cast polymer solution to form a polymer film which embeds therein the fixed optical fibers on the substrate;

placing a glass photomask having a pattern of an optical waveguide on the polymer film so as to align the pattern thereof with positions of the embedded ends of the optical fibers;

irradiating an ultra violet light on the glass photomask so as to form an original figure of an optical polymer waveguide in the polymer film, the waveguide being connected to the ends of the embedded optical fibers; and removing the residual monomer contained in the original figure of the optical polymer waveguides by drying the polymer film fixed to the substrate in a vacuum after taking off the glass photomask from the polymer film to form a final optical waveguide contained in the polymer film.

2. The method of claim 1 comprising coating the surface of the obtained polymer optical circuit with a cladding layer made of an epoxy resin with a lower refractive index than that of the polymer film.

3. The method of claim 1, wherein the substrate is made of glass, and the V-shaped grooves provided thereon are formed by ultrasonic cutting.

4. The method of claim 1, wherein the substate with the V-shaped grooves as well as the framework are made by molding a methylpentene polymer.

5. The method of claim 1, wherein the polymer solution is made of methylene chloride solution of polycarbonate synthesized from 1,1-(4,4'-dihydroxydiphenyl)-cyclohexane.

6. The method of claim 1, wherein the photopolymerizing monomer is methyl acrylate.

7. The method of claim 1, wherein the sensitizer is benzoin ethylether.

8. The method of claim 1, wherein the thermal inhibitor is hydroquinone.

* * * * *